April 30, 1935.　　　　M. D. SARBEY　　　　1,999,303

MOTOR

Filed April 3, 1933

INVENTOR:
MAURICE D. SARBEY

Kwis Hudson & Kent
ATTORNEYS

Patented Apr. 30, 1935

1,999,303

UNITED STATES PATENT OFFICE 1,999,303

MOTOR

Maurice D. Sarbey, Bay Village, Ohio

Application April 3, 1933, Serial No. 664,045

6 Claims. (Cl. 172—279)

The present invention relates to electrical equipment and more particularly to a bearing assembly for transmitting electrical current between relatively rotatable members.

In the prior art, it has been common practice to transmit electrical current to a rotatable member, such as the rotor of a motor, by means of brushes and slip rings or a commutator, the contacting surfaces of which have been subject to wear, necessitating the frequent replacement of the brushes and/or rings or commutators. In the case of oscillatory members, flexible leads have been employed but the constant flexing to which these leads are subjected during operation causes them to break, etc. The methods heretofore employed for transmitting electrical current to a rotatable member are subject to numerous disadvantages, such as those noted above and others well known to those familiar with the art. And it is an object of the present invention to provide a novel means for transmitting electrical current to a rotatable member which will be free from the disadvantages of the prior art.

Another object of this invention is the provision of a novel bearing assembly for transmitting electrical current to a rotatable member through the bearing or bearings which support the same.

Another object of the invention is the provision of a novel bearing through which electrical current may be transmitted to a rotatable member which bearing will be insulated from the frame of the machine, etc., and in which the frame of the machine, etc. is not in the electric circuit.

Another object of the invention is the provision of a novel electrical device comprising a rotatable member in which an electric circuit to the rotor is completed through the bearing therefor.

Another object of the invention is the provision of a novel electric motor the rotor bearings of which are employed to transmit electrical current to the rotor.

Further objects and advantages of the invention will be apparent to those skilled in the art from the following description of the preferred embodiment of the invention described with reference to the accompanying drawing, in which.

Similar reference characters designate corresponding parts throughout the several figures of the drawing, in which the invention is illustrated as embodied in a single-phase, squirrel cage stator, wound rotor induction motor of the split-phase type.

Figure 1:
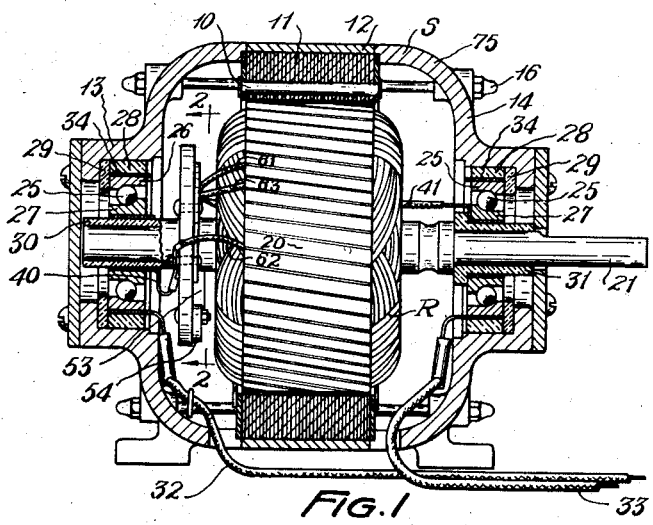
Fig. 1 is a central vertical section, in the plane of the axis, through a motor embodying the present invention, with the rotor shown in elevation.
Figure 2:
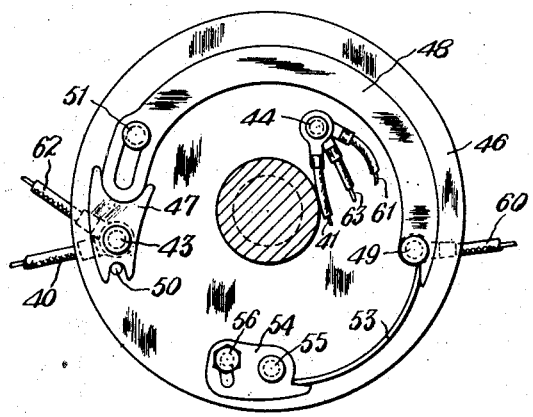
Fig. 2 is a section on the line 2—2 of Fig. 1.
Figure 3:
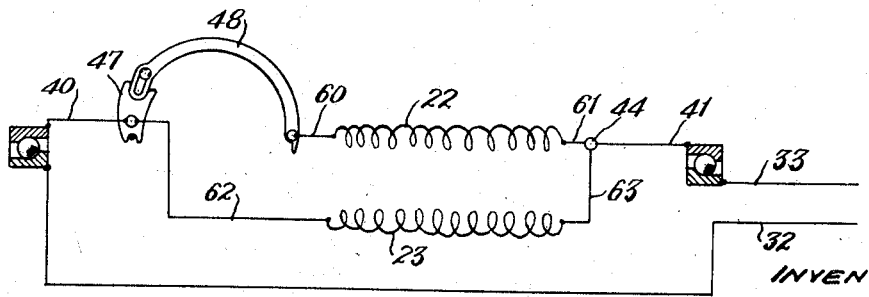
Fig. 3 is a wiring diagram of the motor shown in Fig. 1.

Referring to the drawing, the stator of the motor is designated in general by the reference character S and comprises stator windings of the squirrel cage type consisting of a plurality of parallel copper bars 10 supported in laminations 11, a central frame member 12, and two end bells 13 and 14. The laminations 11 are secured in the central frame member 12 in any convenient manner and the entire assembly is held together by bolts 15 and nuts 16. The rotor, designated in general by the reference character R, is of the wound rotor type comprising a laminated core 20 secured to the rotor shaft 21 provided with an auxiliary or starting winding 22 and a main winding 23, and a centrifugal switch adapted to open the starting circuit after the rotor has attained a predetermined speed. The motor thus far described is of conventional construction well known in the art, and further description thereof is considered unnecessary.

The rotor R is rotatably supported in the stator S by means of anti-friction bearings comprising bearing members or balls 25 and outer and inner race rings 26 and 27 respectively. The bearing boxes or outer race rings 26 are secured in the end bells and insulated therefrom in any suitable manner, as by annular bakelite bushings 28 and disc-shaped bakelite bushings 29. The journals or inner race rings 27 are secured to the rotor shaft 21 and insulated therefrom in any suitable manner, as by bakelite bushings 30 and 31.

One of the supply leads or conductors 32 and 33, connected to any suitable power line, etc., is connected to each of the outside race rings through annular copper members 34 positioned between the outside race rings 26 and the bakelite bushings 28. The copper member 34 may be soldered to the rotor race rings, if desired, or the leads 32 and 33 may be connected to the race rings in any convenient manner other than that illustrated.

The rotor windings 22 and 23 are connected to the inner race rings 27 through leads or conductors 40 and 41 connected to the left and right inner race rings respectively, as viewed in Fig. 1, in any suitable manner as by annular copper members 42 positioned between the inner race rings 27 and the respective bushings 30 and 31. The leads or connectors 40 and 41 are connected to a combination terminal post and pivot 43 and a terminal post 44 respectively, both of which are secured in a flange member 46 formed integral with the bushing 30.

The centrifugal switch referred to above and through which the starting circuit is completed, as illustrated, comprises two members 47 and 48 pivotally supported on the combination terminal posts and pivots 43 and 49 respectively. Stops 50 and 51, also secured in the flange 46, limit the movement of the members 47 and 48 respectively about their pivots. The member 48 is continuously urged toward or into contact with the member 47 by a spring 53 one end of which engages the member 48 and the other a member 54 pivotally supported on a pin 55 secured in the flange 46. The member 54 is adjustable about the pin 55 and held in any adjusted position by a nut 56 to vary the tension of the spring 53. The construction is such that the member 48 is swung about its pivot 49 under the action of centrifugal force, to open the auxiliary or starting winding 22 when the rotor has attained a predetermined speed. The centrifugal switch shown is merely for the purpose of illustration, and it is to be understood that other types of centrifugal switches may be used with equal facility.

The circuits to the auxiliary or starting winding 22 and the main winding 23 are completed as follows: The terminal wires or leads 60 and 61 of the auxiliary or starting winding 22 are connected to the combination terminal post and pivot 49 and the terminal post 44, respectively. The terminal wires or leads 62 and 63 of the main winding 23 are connected to the combination terminal post and pivot 43 and the terminal post 44 respectively. From the foregoing description, it will be apparent that, upon connecting the leads 32 and 33 to a suitable supply source, current will be supplied to both rotor windings through the leads 32 and 33, outer races 26, balls 25, inner races 27, leads 40 and 41, etc.

The present invention is also particularly adaptable to single-phase, squirrel cage rotor, wound stator induction motors of the split-phase type wherein the centrifugal switch only is mounted on the rotor. In this type of machine, the bearings carry only the starting current, and this merely during the starting of the motor.

The preferred embodiment of the invention has been described with reference to the particular construction of motor illustrated, but it is to be understood that the invention is capable of various embodiments, and I do not wish to be limited to the particular construction illustrated and described. For example, the bearings employed may be sleeve bearings, or the bearing members may be rollers instead of balls, and the same applied to any device when it is desired to transmit current to a movable or rotatable member. And I particularly point out and claim as my invention, the following:

1. An electric motor comprising a stator, a bearing box supported by said stator, means for electrically insulating said bearing box from said stator, a rotor, a journal on said rotor for rotatably supporting the same in said bearing box, means for electrically insulating said journal from said rotor, an electric circuit on said rotor, and means for connecting said bearing box and said journal in series with said circuit whereby said circuit is completed through the bearing assembly of the motor.

2. An electric motor comprising a stator, a bearing box supported by said stator, means for electrically insulating said bearing box from said stator, a rotor, a journal on said rotor for rotatably supporting the same in said bearing box, means for electrically insulating said journal from said rotor, a centrifugal switch on said rotor, and means for connecting said bearing box and said journal in series with said centrifugal switch whereby the circuit through said switch is completed through the bearing assembly of the motor.

3. An electric motor comprising a stator, a race ring fixed to said stator, means for electrically insulating said race ring from said stator, a rotor, a second race ring fixed to said rotor, means for insulating said second race ring from said rotor, anti-friction bearings between said race rings for rotatably supporting said rotor in said stator, an electric circuit on said rotor, and means for connecting said race rings in series with said circuit whereby said circuit is completed through the bearing assembly of the motor.

4. A single phase induction motor comprising a stator, a bearing box supported by said stator, means for insulating said bearing box from said stator, a rotor, a journal on said rotor for rotatably supporting the same in said stator, means for insulating said journal from said rotor, a conductor in said motor circuit connected to said bearing box, and a conductor in said motor circuit connected to said journal whereby the motor circuit is completed through the bearing assembly of the motor.

5. A single phase induction motor comprising a stator, a bearing box supported by said stator, means for electrically insulating said bearing box from said stator, a rotor, a journal on said rotor for rotatably supporting the same in said stator, means for insulating said journal from said rotor, a centrifugal switch in the motor circuit carried by said rotor, and means for connecting said bearing box and said journal in series with said centrifugal switch whereby the motor circuit is completed through the bearing assembly of the motor.

6. A single phase induction motor comprising a stator, a race ring supported by said stator, means for electrically insulating said race ring from said stator, a rotor, a second race ring fixed to said rotor, means for electrically insulating said second race ring from said rotor, anti-friction bearing members between said race rings for rotatably supporting said rotor in said stator, a centrifugal switch in said motor circuit carried by said rotor, and means for connecting said race rings in series with said switch whereby the motor circuit is completed through the bearing assembly of the motor.

MAURICE D. SARBEY.